(12) United States Patent
Ootake et al.

(10) Patent No.: US 7,468,206 B1
(45) Date of Patent: Dec. 23, 2008

(54) ORGANIC ULTRA-THIN FILM

(75) Inventors: Tadashi Ootake, Neyagawa (JP); Yasuo Takebe, Katano (JP); Norihisa Mino, Nara (JP); Hiroaki Takezawa, Katano (JP)

(73) Assignee: Panasonic Corporation, Osaka (JP)

( * ) Notice: Subject to any disclaimer, the term of this patent is extended or adjusted under 35 U.S.C. 154(b) by 481 days.

(21) Appl. No.: 08/992,049

(22) Filed: Dec. 17, 1997

(30) Foreign Application Priority Data

Dec. 19, 1996 (JP) ............................. HEI 8-339749

(51) Int. Cl.
*G11B 5/64* (2006.01)
*B05D 1/18* (2006.01)

(52) U.S. Cl. ........................ 428/336; 428/332; 428/333; 428/411.1

(58) Field of Classification Search ................. 428/333, 428/447, 423.1, 425.6, 446, 450, 332, 336, 428/411.1, 688, 689, 704, 923, 924, 926, 428/429; 427/496, 506, 551, 575
See application file for complete search history.

(56) References Cited

U.S. PATENT DOCUMENTS

| 3,558,345 | A |  | 1/1971  | Baum, et al. |  |
|-----------|---|---|--------|--------------|---|
| 3,787,281 | A |   | 1/1974  | Effenberger  |  |
| 4,022,876 | A |   | 5/1977  | Anbar        |  |
| 4,185,140 | A |   | 1/1980  | Strella et al. |  |
| 4,221,697 | A |   | 9/1980  | Osborn et al. |  |
| 4,373,009 | A |   | 2/1983  | Winn         |  |
| 4,439,514 | A | * | 3/1984  | Garito ........................ 430/272 |  |
| 4,539,061 | A |   | 9/1985  | Sagiv        |  |
| 4,623,638 | A | * | 11/1986 | Hayatsu et al. ............. 502/401 |  |
| 4,731,504 | A |   | 3/1988  | Achille et al. |  |
| 4,795,787 | A |   | 1/1989  | Walz         |  |
| 4,833,033 | A |   | 5/1989  | Sannohe et al. |  |
| 4,863,978 | A |   | 9/1989  | Plueddemann  |  |
| 4,988,301 | A | * | 1/1991  | Kinberg ...................... 434/410 |  |
| 5,002,582 | A | * | 3/1991  | Guire et al. .................... 623/66 |  |
| 5,035,763 | A |   | 7/1991  | Wegner et al. .............. 156/230 |  |
| 5,068,150 | A |   | 11/1991 | Nakamura et al. |  |
| 5,221,416 | A |   | 6/1993  | Kishi et al.  |  |
| 5,266,309 | A |   | 11/1993 | Gardella, Jr. et al. |  |
| 5,283,339 | A |   | 2/1994  | Arnold et al. |  |
| 5,358,825 | A | * | 10/1994 | James ........................ 430/271 |  |
| 5,363,994 | A |   | 11/1994 | Angeline     |  |
| 5,372,851 | A | * | 12/1994 | Ogawa et al. ................ 427/255 |  |
| 5,415,899 | A |   | 5/1995  | Nakayama et al. ........ 427/430.1 |  |

(Continued)

FOREIGN PATENT DOCUMENTS

EP            0 484 886 A1       5/1992

(Continued)

*Primary Examiner*—Elena T Lighfoot
(74) *Attorney, Agent, or Firm*—Panitch Schwarze Belisario & Nadel LLP

(57) ABSTRACT

The present invention provides an organic ultra-thin film firmly fixed to a substrate with the film thickness ranging from tens of nm to hundreds of nm. The organic ultra-thin film comprises polymers fixed on a substrate by $M_2$—O—A—bond in which A represents an Si, Ge, Ti, Sn or Zr atom in the polymer, and $M_2$ represents an atom in the substrate) or by a coordinate bond, the polymers are combined with each other by —$A_1$—O—$A_1'$— bond in which $A_1$ and $A_1'$ are Si, Ge, Ti, Sn, Zr or S or by a coordinate bond.

3 Claims, 11 Drawing Sheets

U.S. PATENT DOCUMENTS

| | | | |
|---|---|---|---|
| 5,435,839 A * | 7/1995 | Ogawa | 106/10 |
| 5,444,811 A | 8/1995 | Yoshimura et al. | 385/141 |
| 5,461,166 A * | 10/1995 | Mino et al. | 549/4 |
| 5,499,547 A | 3/1996 | Nagai et al. | |
| 5,512,131 A | 4/1996 | Kumar et al. | |
| 5,578,351 A * | 11/1996 | Shashibar et al. | 428/1 |
| 5,591,481 A * | 1/1997 | Takahashi et al. | 427/131 |
| 5,591,487 A | 1/1997 | Ohtake et al. | 427/299 |
| 5,599,695 A * | 2/1997 | Pease et al. | 435/91.1 |
| 5,622,896 A | 4/1997 | Knotter et al. | |
| 5,624,711 A | 4/1997 | Sundberg et al. | 427/261 |
| 5,643,665 A * | 7/1997 | Saidi | 428/330 |
| 5,733,342 A | 3/1998 | Greindl et al. | |
| 5,747,158 A * | 5/1998 | Mino et al. | 428/333 |
| 5,780,148 A | 7/1998 | Ohtake et al. | |
| 5,885,753 A * | 3/1999 | Crooks et al. | 430/325 |
| 5,919,523 A * | 7/1999 | Sundberg et al. | 427/333 |
| 5,981,056 A * | 11/1999 | Ogawa et al. | 428/333 |
| 6,090,447 A | 7/2000 | Suzuki et al. | |
| 6,132,860 A | 10/2000 | Bruxvoort et al. | |

FOREIGN PATENT DOCUMENTS

| | | | |
|---|---|---|---|
| EP | 0 561 279 A1 | | 9/1993 |
| EP | 0 583 894 A2 | | 2/1994 |
| EP | 5888237 | * | 3/1994 |
| JP | 53-124781 A | | 10/1978 |
| JP | 59038599 | * | 3/1984 |
| JP | 02001168 A | | 1/1990 |
| JP | 04293573 A | | 10/1992 |
| JP | 06-256400 A | | 9/1994 |
| JP | 7-48459 A | | 2/1995 |
| JP | 09-214105 A | | 8/1997 |
| WO | WO 94 21386 | | 9/1994 |
| WO | 9808885 | * | 8/1997 |

* cited by examiner

ORGANIC ULTRA-THIN FILM

BACKGROUND OF THE INVENTION

The present invention relates to an organic ultra-thin film, particularly a thin film ranging in thickness from 5 nm to 100 nm, and a method for making the same.

Various techniques for forming and fixing an organic thin film on a substrate have already been known. Among them are a chemical absorption method (K. Ogawa et al., Langmuir, 6, 851 (1990)), the Langmuir-Blodgett method (hereafter referred to as the LB method), a casting method and a spin-coating method.

An ultra-thin film of angstrom level, that is, a monomolecular layer can be obtained by the chemical absorption method or the LB method. In those methods, the film thickness can be increased by forming one monomolecular layer upon another, and the thickness can be controlled with high accuracy by adjusting the repetition of that layer forming process.

The chemical absorption method is the most suitable for forming an ultra-thin film of angstrom level with a very high bonding strength to the substrate. However, this method involves a difficulty in forming a thin film ranging in thickness from 5 nm to 100 nm. A thick film can be obtained by a repetition of forming the monomolecular layer as mentioned above. However, in forming a new monomolecular layer on the surface of the originally formed monomolecular layer, it is necessary to modify the surface of the originally formed monomolecular layer with a highly reactive functional group. This process is very troublesome. Furthermore, since molecules used in the chemical absorption method are generally have a length of several nm in maximum, and one round of forming monomolecular layer can increase the film thickness by only several nm. This means that to produce a film not thinner than 10 nm, for example, the monomolecular layer formation and surface modification have to be repeated alternately tens of times. Such repetition take much time and labor.

On the other hand, the LB method is well established unlike the chemical absorption method with regard to the step of laminating monomolecular layers. But the obtained film is fixed to the substrate by an ionic bond, and one layer is bonded to another by the ionic bond or an intermolecular force. Therefore, the film produced by this method has a fatal shortcoming of a low bonding strength.

With the casting method or the spin-coating method, the film obtained has a relatively large thickness of micron level, and it is difficult to form a thin film ranging in thickness from 5 nm to 100 nm.

A film can also be formed by graft polymerization. In this method, the thickness of the film can be regulated, to a certain extent, by controlling a polymerization time, a monomer concentration and other factors. But this method has a problem that the substrate has to be given a special surface treatment—modification with a specific functional group of the surface of the substrate. Furthermore, no high-precision surface treatment technique has been established yet.

Also taken up for study recently is formation of a mixed film of inorganic and organic substances so-called hybrid polymer using a sol-gel method. The techniques of this type are classified roughly into two processes as follows. One uses an organic polymer with a metal alkoxide introduced into the side chain directly. The other involves mixing an organic polymer and the metal alkoxide, and causing them to react in formation of the film. Both of these processes use such metal alkoxides as those with Si, Al, Ti, Zr and Zn. With either of the processes, however, it is difficult to form the hybrid polymer film not thicker than 100 nm. Another problem is that fine particles of inorganic substances such as silica are liable to be formed in the sol or gel containing metal alkoxide, in general. Therefore, a thin film obtained tends to take a structure with organic polymers dotted among the inorganic fine particles. In other words, according to the sol-gel method, it is hard to produce a thin film having a structure which can be deemed as an organic polymer film.

It has also been practiced widely to coat the substrate with a fluorocarbon resin film. However, the fluorocarbon resin film sticks to the substrate only mechanically and is not fixed to the substrate by a strong bond like a chemical bond. Thus, the fluorocarbon resin film easily detaches from the substrate. Such detachment can be suppressed by increasing the thickness of the film. However, if the thickness is increased, cracks are liable to occur in the film since fluorocarbon resin is generally low in physical interlocking and interaction among the molecular chains, which means a weak cohesive force.

As indicated above, with any of the conventional methods, it is difficult to form an ultra-thin film ranging in thickness from 5 nm to 100 nm firmly fixed on the substrate.

BRIEF SUMMARY OF THE INVENTION

It is an object of the present invention to provide an organic ultra-thin film fixed very strongly onto a substrate.

A method for making an organic ultra-thin film according to the present invention includes a step of bringing into contact with a substrate a polymer having one functional group represented by Formula (1) or Formula (2) or one functional group which can be coordinated to a metal, thereby fixing the polymer on the surface of the substrate:

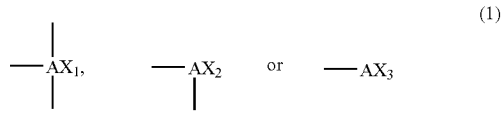

(1)

in which A represents Si, Ge, Ti, Sn or Zr, and X represents a halogen atom, alkoxyl group or isocyanate group;

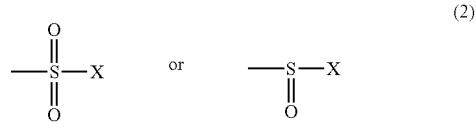

(2)

in which X represents a halogen atom.

An organic ultra-thin film according to the present invention comprises polymers fixed to a substrate by a bond represented by Formula (3) or (4), and the polymers are combined to each other by a coordinate bond or a bond defined by Formula (5):

M₂—O—A—  (3)

in which A represents Si, Ge, Ti, Sn or Zr in the polymer, and M₂ represents an atom in the substrate;

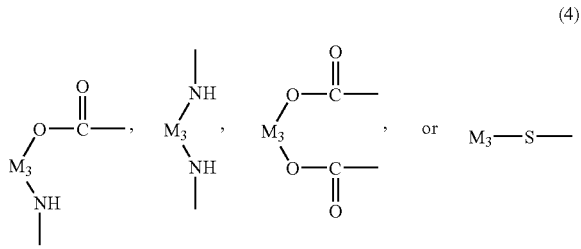
(4)

in which $M_3$ represents a transition metal in the substrate, and $S$ represents sulfur in the polymer;

(5)

in which $A_1$ and $A_1'$ each represent Si, Ge, Ti, Sn, Zr or S.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
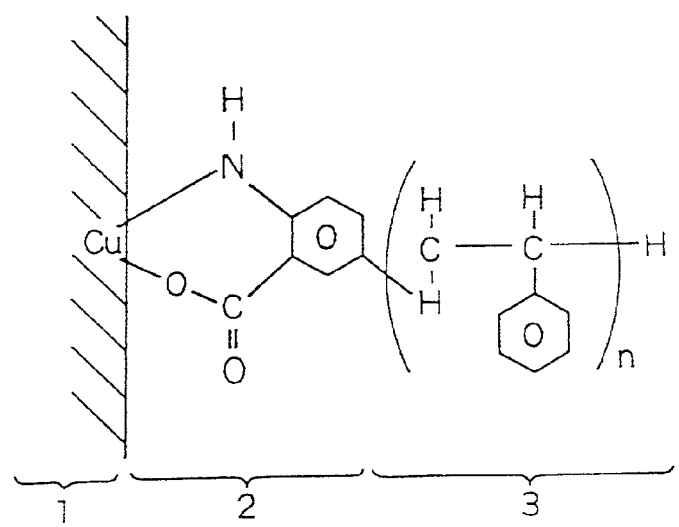
FIG. 1 is a view showing the structure of an organic ultra-thin film in an embodiment of the present invention.

The methods for making an organic ultra-thin film in accordance with the present invention can be basically classified into the following three processes:

The first process comprises a step of bringing into contact with a substrate a polymer having one functional group selected from the group consisting of a functional group represented by Formula (1), a functional group represented by Formula (2) and a functional group which is capable of coordinating to a metal, thereby fixing the polymer on the surface of the substrate.

(1)

(2)

The second process comprises a step of bring into contact with a substrate a polymer having at least two functional groups selected from the group consisting of a functional group represented by Formula (1), a functional group represented by Formula (2) and a functional group which is capable of coordinating to a metal, thereby fixing the polymer on the surface of the substrate.

The third process comprises the steps of: bringing into contact with a substrate molecules having at least one functional group selected from the group consisting of a functional group represented by Formula (1), a functional group represented by Formula (2) and a functional group which is capable of coordinating to a metal and further having a polymerizable functional group, thereby fixing the molecules on the substrate; and placing another monomer on the polymerizable functional group to effect polymerization, thus forming an organic ultra-thin film.

The suitable polymerizable functional groups for the purpose include C=C (including vinyl group and cyclic olefine), C≡C, C=C—C=C (including cyclic diolefine), P=N, phenyl group, 2,4-substituted benzene skeleton group, 1,3-substituted benzene skeleton group, epoxy group, four-membered ring ether group, five-membered ring ether group, 2,6-substituted phenol skeleton group, 2,4,6-substituted phenol skeleton group, five-membered ring acetal skeleton group, six-membered ring acetal skeleton group, seven-membered ring acetal skeleton group, eight-membered ring acetal skeleton group, four-membered ring lactone skeleton group, five-membered ring lactone skeleton group, six-membered ring lactone skeleton group, hydroxyl group, carboxyl group, halogenated acyl group, acid anhydrous group, halogens, carboxylate group, primary amino group, secondary amino group (including three-membered ring, four-membered ring, five-membered ring and six-membered ring amino groups), tertiary amino group (including three-membered ring, four-membered ring, five-membered ring, six-membered ring and bicyclic six-membered ring amino groups), six-membered ring imino ether skeleton group, isocyanate group, pyrrole skeleton group, thiophene skeleton group, sulfide group and cyclic sulfide group.

It is possible to form an organic ultra-thin film by combining the above-mentioned functional group with monomers and then polymerizing the monomers.

The suitable polymerization reactions to make the polymer grow are radical polymerization, anionic polymerization, cationic polymerization and coordination polymerization.

To effect polymerization, it is preferable to use light, heat or a catalyst. A solvent is also applied in some cases.

In any of the above-mentioned processes, a functional group represented by Formula (6), or one being capable of chelating and represented by Formula (7) is preferably used as a functional group which can be coordinated to a metal:

$$—S—M_1 \tag{6}$$

in which S represents sulfur and $M_1$ represents a hydrogen atom or an metallic atom;

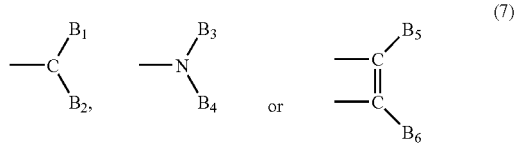

in which $B_1$ to $B_6$ represent $(CH_2)_n COOM$ (n is 0 to 3, and M is a hydrogen atom or a metallic atom) or $(CH_2)_m NXY$ (m is 0 to 2, and X and Y independently represent a hydrogen atom, an alkyl group with 1 to 8 carbon atoms, phenyl group or a hydrocarbon group with 8 or less carbon atoms). The double bond in Formula (7) may be a part of benzene ring or other aromatic rings.

If the polymer to be combined with the substrate contains a functional group represented by Formula (1) or Formula (2), this polymer will be fixed to the substrate by a bond represented by Formula (3). If the polymer to be fixed to the substrate contains a functional group represented by Formula (6) or (7), this polymer will be fixed to the substrate by a bond represented by Formula (4). The bonds represented by Formula (3) and Formula (4) are both strong ones.

Further, it is preferable that the polymer to be combined to the substrate contains any of the functional groups represented by the Formulae (1), (2), (6) and (7) since the polymers can be combined with each other.

In either of the processes, after fixing the polymer on the substrate, unreacted monomers are removed, if necessary.

It is preferable that the substrate on which a polymer with the functional group represented by Formula (1) or Formula (2) is fixed should have a functional group containing active hydrogen on the surface.

The preferable functional groups containing active hydrogen includes hydroxyl group, carboxyl group, sulphinic group, sulfonic group, phosphoric group, phosphorous group, thiol group, amino group and those having the above functional group but with alkali metal or alkaline earth metal substituted for the active hydrogen. These functional groups are preferably present on the surface of the substrate or on the surface of a chemical absorption film fixed beforehand on the substrate containing the above-mentioned functional group.

If the above-mentioned functional groups are not or hardly present on the surface of the substrate, then it is desired that the substrate surface should be modified by such treatments as UV/ozone treatment, oxygen plasma treatment or a treatment with such oxidizing agents as potassium permanganate so as to bring about or increase the above-mentioned functional groups.

It is required that the substrate on which a polymer with a functional group capable of coordinating to a metal is fixed should have a transition metal exposed on the surface, that is to say, no metal oxide film etc. should be present.

The following materials can be cited as substrates that can be used in the present invention:

glass, ceramics, fiber, paper, metal and synthetic resin.

In a preferred mode of the present invention, the organic ultra-thin film comprises polymers fixed to the substrate by a bond represented by Formula (3) or Formula (4), these polymers combined to each other by coordinate bond or a bond represented by Formula (5).

$$—A_1—O—A_1'— \tag{5}$$

If the polymers are combined to each other, a film with a high durability can obtained.

In another preferred mode of the present invention, the organic ultra-thin film has a first layer of monomolecules fixed to the substrate by a bond represented by Formula (3) or Formula (4) and a second layer comprising polymers bonded to the above-mentioned monomolecules.

Such organic ultra-thin films can be formed by a process in which a monomolecular layer is formed firmly fixed to a substrate and the molecules in the monomolecular layer are then poly condensed with added monomers, or another process in which polymerizable functional groups impregnated with monomolecules are addition-polymerized with monomers and these monomers are then polymerized. In either of the processes, the thickness of a film obtained can be controlled by adjusting the length of the polymer to be polymerized with the monomolecule.

The organic ultra-thin films according to the present invention are preferably in a range of 5 nm to 100 nm in thickness. The thin films within this range can be formed efficiently by the above-mentioned methods. Also, within that range, films are so transparent that the appearance of patterns on the substrate, material texture etc. can generally be maintained. Needless to say, the film can be colored with the transparency kept unimpaired. Such thin films can be used in a variety of applications as an insulating film, an electric conductive film, an transmission film, an adhesive film, an absorption film, a protective film, etc.

Ultra-thin films containing a fluorine atom in particular are expected to find wide use as functional materials because of their features including water- and oil-repellencies, a low friction property, a high strippability, high electrostatic charging property, low refractive index, high bio-compatibility, nonflammability, etc.

Such organic ultra-thin films can be realized without difficulty by the present invention.

In all cases of the polymers formed by a growth from the monomolecular layer or the polymers fixed onto the monomolecular layer, the polymers are very effective in practical use as mentioned below:

For example, in the case that the polymer is polyethylene, polyvinyl alcohol, polyethylene terephthalate, it-polypropylene, 6-nylon or polyoxymethylene, the thin film shows high bending strength.

In the case of alamid, polyacrylate, polyazomethyne or a heterocyclic polymer, the thin film exhibits stiffness.

In the case of polyacrylamide, polyvinyl alcohol, polyvinylmethyl ether or polystyrene sulphonic acid, the thin film exhibits high swelling property.

In the case of aromatic polyether, polyarylate, alamid or polyimide, the thin film exhibits high heat resistance.

In the case of polynorbornene, trans-polyisoprene, polyurethane, styrene-butadiene block copolymer, the thin film exhibits shape-memory property.

In the case of polymethylmethacrylate, polystyrene, polycarbonate or diethylene glycol bis(allyl carbonate), the thin film exhibits high transparency.

In the case of aromatic polyamide, a polymer containing carbazolic group, a polymer containing alicyclic group on the side chain or a polymer containing spiropyran ring on the main chain, the thin film exhibits high refractive index.

In the case of poly(N-vinylcarbazole), the thin film exhibits high light permeability.

In the case that the polymer has a hyperconjugated main chain, the thin film exhibits high electric conductivity.

In the case of polyether, polyester, polyamine or polysulfide, the thin film exhibits high ion conductive property.

In the case that the polymer has the hyperconjugated main chain and the side chain with an unpaired electron such as radical, the thin film can be magnetized.

In the case that the polymer has a symmetric structure with respect to the main chain, the thin film exhibits high piezo- and pyro-electricities.

In the case that the polymer is polyester, polylactanoid, polylactone, polyacid anhydride, polyorthoester, poly(ester cyanoacrylate), polyphosphagen, a polysaccharide, nucleic acid, poly($\beta$-hydroxyalkylcarboxylic acid) or a protein, the thin film is high in bio-compatibility.

Now, the present invention is hereafter described in detail, giving concrete embodiments.

EXAMPLE 1

Solution A was prepared by mixing 18 ml of isopropanol and 0.2 ml of 4-vinyl anthranilic acid.

A glass substrate, on the surface of which copper had been deposited beforehand, was then dipped in the solution A and left there standing for one hour. After that, the substrate was rinsed with about 100 ml of benzene and left to air-dry, thereby forming a thin film.

When the thin film thus prepared was studied by Fourier-transform infrared spectroscopy (hereinafter referred to as FT-IR), characteristic signals were found at wavenumbers of 1,660 cm$^{-1}$, 1,610 cm$^{-1}$ and 1,450 cm$^{-1}$. Those signals indicate the presence of C=C, C—O—Cu and C=C of the benzene ring, respectively.

Then, 50 ml of distilled and refined toluene was mixed with 20 ml of styrene monomer and 40 mg of azobisisobutyronitrile to give a mixture solution. The thin film made as above was dipped in that mixture solution. The babbled nitrogen gas was supplied to the mixture solution for 30 minutes to remove oxygen dissolved therein, and the substrate dipped in the mixture solution was then heated for one hour at 100° C. This substrate was rinsed with toluene and left to air-dry.

When the film thus prepared was examined by FT-IR, no change in signal was observed at a wavenumber of 1,610 cm$^{-1}$ while the signal at 1,450 cm$^{-1}$ was found to have risen about 15 times in intensity.

The film was also measured by ultraviolet visible spectroscopy (hereinafter referred to as UV/VIS). An absorption peak was observed at a wavelength of 230 nm.

Those results show that the film prepared has a structure as shown in FIG. 1. That is to say, a monomolecular layer 2 derived from 4-vinyl anthranilic acid is formed on a substrate 1 with a nitrogen atom derived from the amino group and an oxygen atom derived from the carboxyl group being coordinate-bonded to the copper atom in the substrate 1, and polystyrene 3 which had grown on the monomolecular layer 2 is combined to the monomolecular layer 2.

EXAMPLE 2

Solution B was prepared by mixing 14 ml of distilled and refined hexadecane, 2 ml of distilled and refined tetrahydrofuran (hereinafter referred to as THF), 2 ml of 10-(thienyl) decyl trichlorosilane and 10.8 mg of dry FeCl$_3$, followed by stirring for 30 minutes.

A glass substrate was dipped in the solution B and left there standing for one hour. Then, the substrate was rinsed with about 100 ml of THF and left to air-dry, thereby forming a thin film.

Figure 2:
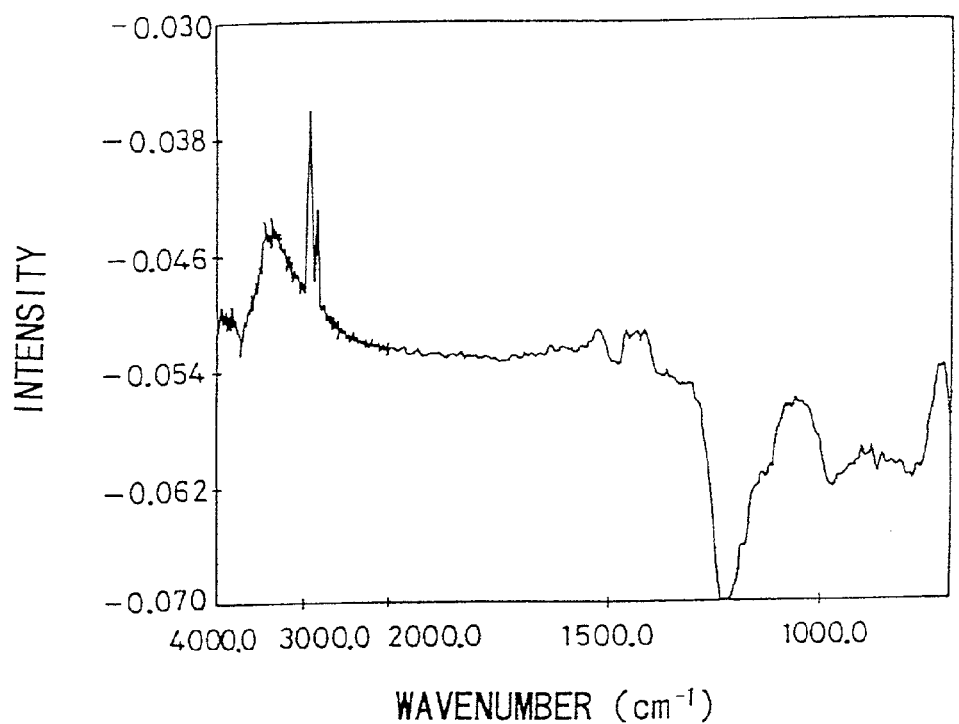
FIG. 2 is an FT-IR (Fourier-transform infrared spectroscopy) spectral diagram of an organic ultra-thin film in another embodiment of the present invention.

When the thin film thus prepared was studied by FT-IR, characteristic signals were found at wavenumbers of 2,927.7 cm$^{-1}$, 1,525 cm$^{-1}$, 1,465 cm$^{-1}$, 1,080 cm$^{-1}$ and 740 cm$^{-1}$, as shown in FIG. 2. Those signals indicate the presence of $\nu$CH$_2$, heterocyclic ring, $\delta$CH$_2$, Si—O and heterocyclic ring, respectively.

Figure 3:
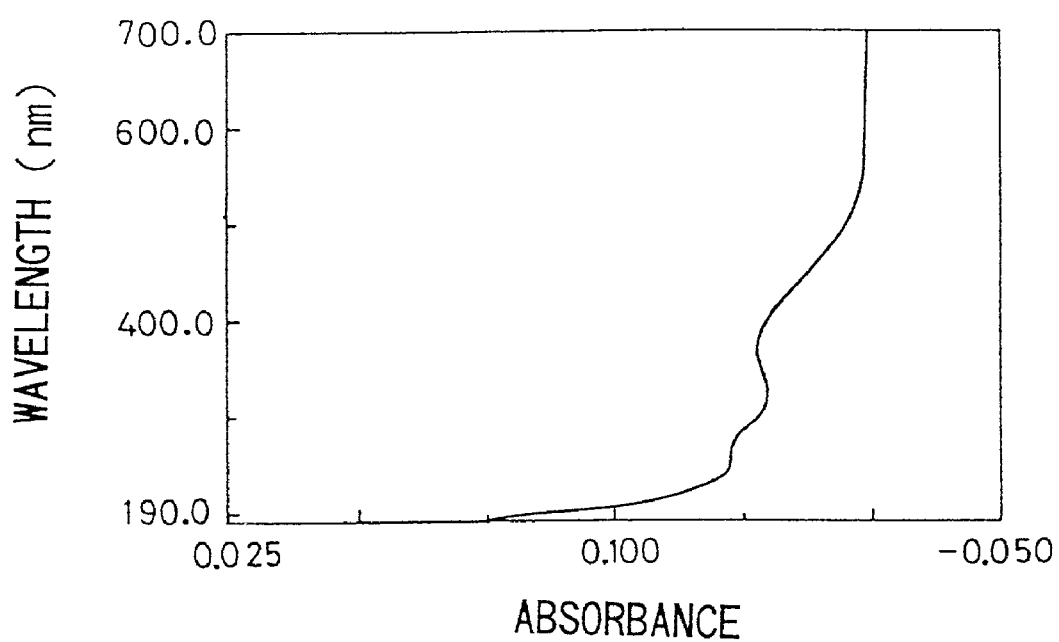
FIG. 3 is a UV-VIS spectral diagram of the same organic ultra-thin film.

The thin film was also measured by UV/VIS, and absorption peaks were observed at wavelengths of 260 nm and 360 nm, as shown in FIG. 3.

Figure 4:
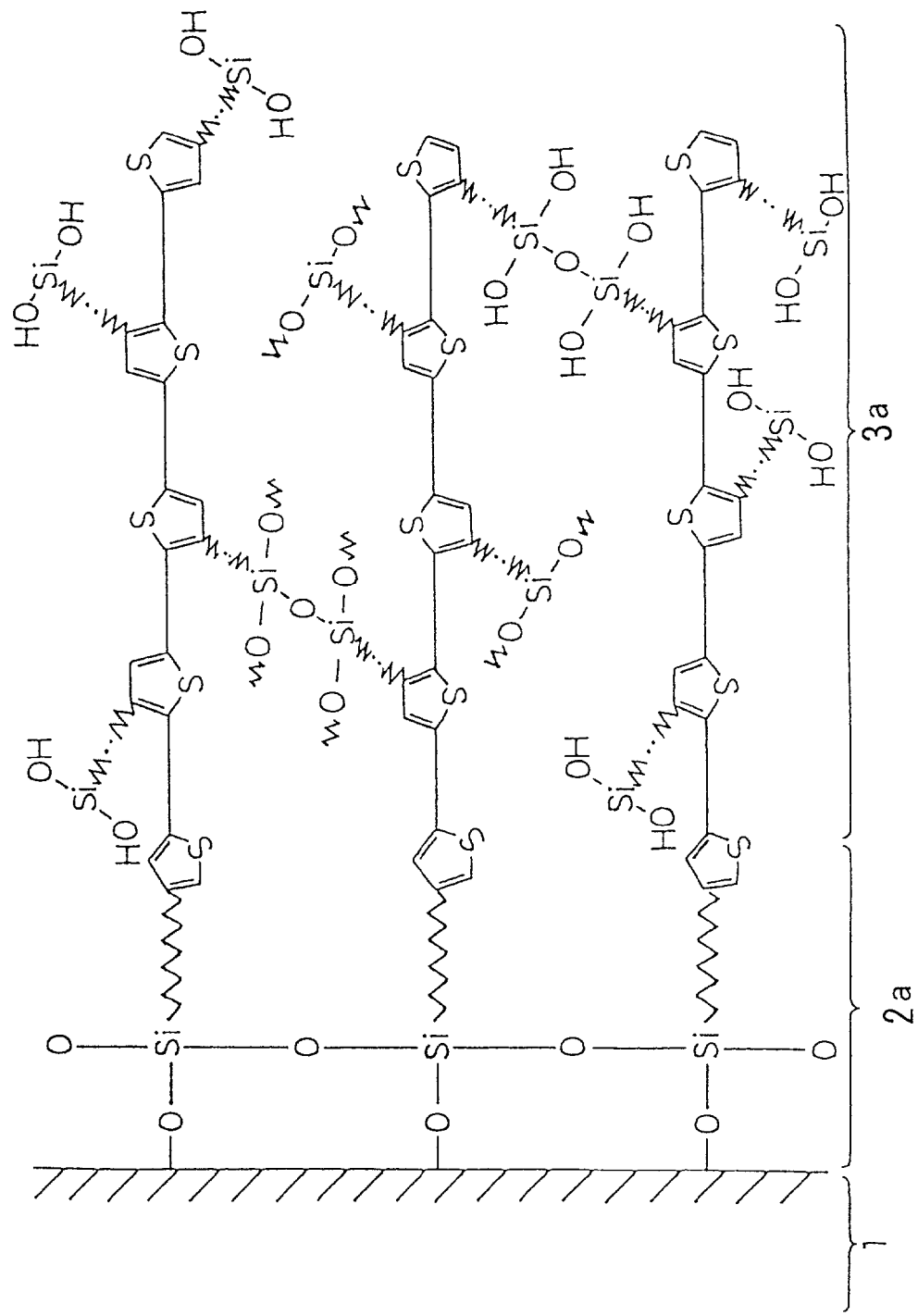
FIG. 4 is a structural view of the same organic ultra-thin film.

Those results show that, in the thin film prepared, as shown in FIG. 4, a layer 2a of 3-decyl thiophene is fixed to a glass substrate 1 by siloxane bond, to this layer 2a in turn fixed a layer 3a formed by polymerization of 10-(thienyl) decyl trichlorosilane. 10-(thienyl) decyl trichlorosilanes are combined with each other into a polymer at the second position of the thiophene ring. The layer 2a of 3-decyl thiophene and this polymer are also combined with each other at the second position of the thiophene ring. Further, the trichlorosilane group of 10-(thienyl) decyl trichlorosilane forms siloxane bond with the respective neighboring trichlorosilane groups in an atmosphere containing moisture, thus the respective polymers combined with each other.

A polarization analysis showed that the thickness of this thin film was 12 nm (refractive index of 1.49).

To test the water repellency, furthermore, water was dropped on the surface of the thin film to measure the contact angle. It was found to be 110°.

To study the heat resistance of the film, pieces of the thin film were heated in the air at 200° C. for 10, 30, 50, 100 or 150 hours, respectively, and the water contact angles were measured. The results are shown in Table 1.

TABLE 1

| Heating time (hours) | 0 | 10 | 30 | 50 | 100 | 150 |
|---|---|---|---|---|---|---|
| Water Contact Angle (degrees) | 110 | 110 | 110 | 110 | 109 | 108 |

As indicated in Table 1, the thin film retains high water repellency even after 150-hour heating. This indicates that the thin film has high heat resistance.

To test the wear resistance, pieces of the thin film were rubbed with dry sponge 1,000, 3,000 or 5,000 times under a load of 2 kgf and the contact angles with water of the rubbed thin films were measured, respectively. The results are shown in Table 2.

TABLE 2

| Number of rubbings | 0 | 1,000 | 3,000 | 5,000 |
|---|---|---|---|---|
| Water Contact Angle (degrees) | 110 | 108 | 105 | 103 |

As shown in Table 2, the film prepared retains high water repellency wear resistance even after 5,000-time rubbing. This indicates that the thin film has high wear resistance.

EXAMPLE 3

Solution C was prepared by mixing 14 ml of distilled and refined hexadecane, 2 ml of distilled and refined THF, 2 ml of 10-(thienyl) decyl trichlorosilane, 12 μl of 3-octyl thiophene and 10.8 mg of dry $FeCl_3$, followed by stirring for 30 minutes.

A glass substrate was dipped in solution C and left there standing for one hour. After that, the substrate was rinsed with about 100 ml of THF and left to air-dry, thereby forming a thin film.

Figure 5:
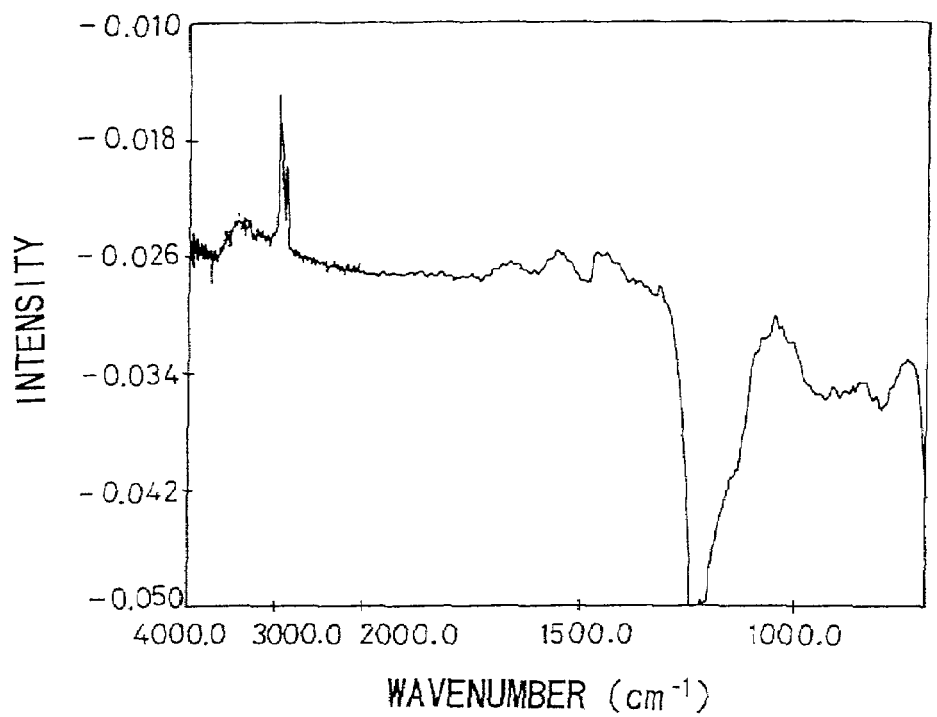
FIG. 5 is an FT-IR spectral diagram of an organic ultra-thin film in other embodiment of the present invention.

When the thin film thus prepared was studied by FT-IR, characteristic signals were found at wavenumbers of 2,927.7 $cm^{-1}$, 1,550 $cm^{-1}$, 1,465 $cm^{-1}$, 1,080 $cm^{-1}$ and 740 $cm^{-1}$ as shown in FIG. 5. Those signals indicate the presence of $vCH_2$, heterocyclic ring, $\delta CH_2$, Si—O and heterocyclic ring, respectively.

Figure 6:
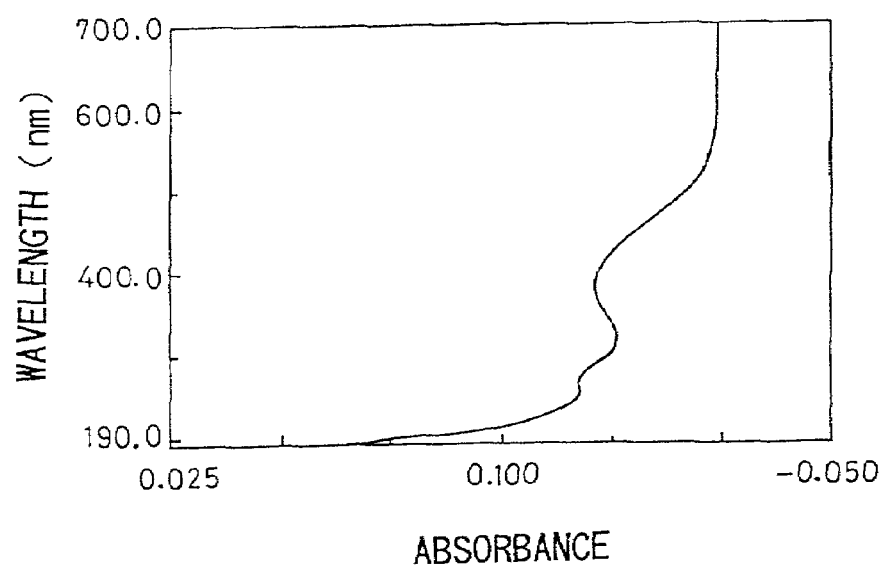
FIG. 6 is a UV/VIS spectral diagram of the same organic ultra-thin film.

The thin film was also measured by UV/VIS, and absorption peaks were observed at wavelengths of 270 nm and 380 nm as shown in FIG. 6.

Figure 7:
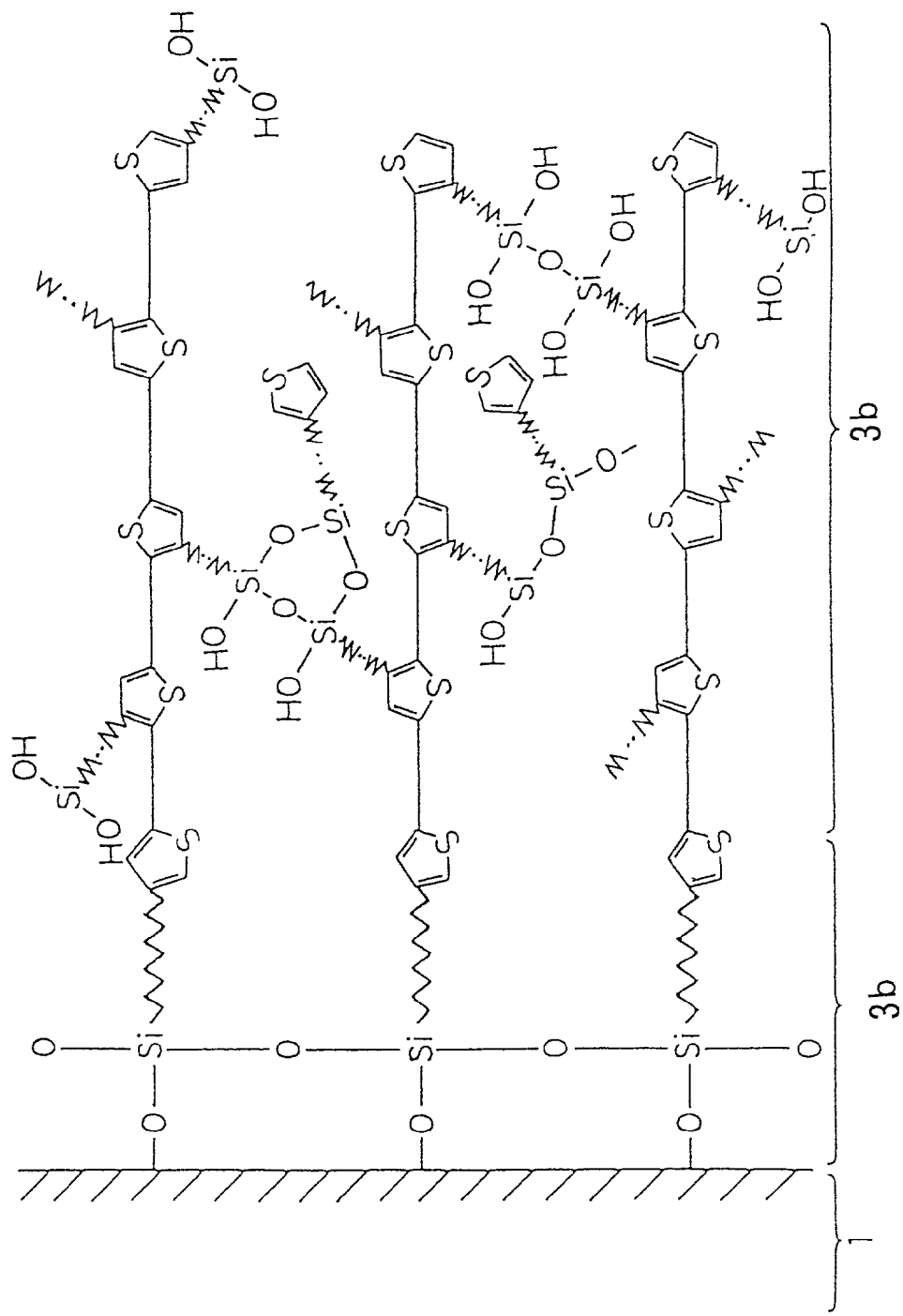
FIG. 7 is a structural view of the same organic ultra-thin film.

Those results show that the prepared thin film has a structure as shown in FIG. 7. That is, a monomolecular layer 2b of 3-decyl thiophene is fixed on the glass substrate 1 by siloxane bond. To this monomolecular layer 2b is fixed a polymer layer 3b formed by polymerization of 10-(thienyl) decyl trichlorosilane and 3-octyl thiophene. 10-(thienyl) decyl trichlorosilane and 3-octyl thiophene are combined with each other into a polymer at the second position of the thiophene ring. The layer containing 3-decyl thiophene and this polymer are also combined with each other at the second position of the thiophene ring. Further, the trichlorosilane group of 10-(thienyl) decyl trichlorosilane forms a siloxane bond with the respective neighboring trichlorosilane group in an atmosphere containing moisture, thus the respective polymers are combined with each other.

A polarization analysis showed that the thickness of this film was 17.5 nm (refractive index of 1.49).

The water contact angle of the thin film was measured in the same way as in Example 2 and found to be 116°.

To study the heat resistance of the thin film, pieces of the thin film were heated in the air at 200° C. for 10, 30, 50, 100 or 150 hours, respectively, and the water contact angles were measured. The results are shown in Table 3.

TABLE 3

| Heating time (hours) | 0 | 10 | 30 | 50 | 100 | 150 |
|---|---|---|---|---|---|---|
| Water Contact Angle (degrees) | 116 | 116 | 116 | 116 | 115 | 115 |

As indicated in Table 3, the thin film prepared retains high water repellency even after 150-hour heating.

To test the wear resistance, pieces of the thin film were rubbed with dry sponge 1,000, 3,000 or 5,000 times under a load of 2 kgf and the contact angles with water were measured, respectively. The results are shown in Table 4.

TABLE 4

| Number of rubbings | 0 | 1,000 | 3,000 | 5,000 |
|---|---|---|---|---|
| Water Contact Angle (degrees) | 116 | 115 | 112 | 110 |

As shown in Table 4, the thin film retains high water repellency even after 5,000-time rubbing.

EXAMPLE 4

A thin film was formed on a glass substrate in the same way as in Example 3. This glass substrate with a thin film formed thereon was then dipped in a solution prepared by dissolving $FeCl_3$ in distilled and refined acetonitrile for 30 minutes. The substrate was then rinsed with acetonitrile and left to air-dry. In this way, the thin film formed as in Example 3 was doped.

After electrically conductive paste was applied on the thin film thus prepared to form electrodes, electric conductivity was measured by two-terminal method. Then, it was found to be high at $2 \times 10^{-3}$ S/cm.

EXAMPLE 5

Solution D was prepared by mixing 14 ml of distilled and refined hexadecane and 0.2 ml of 10-(thienyl) decyl trichlorosilane.

A glass substrate was then dipped in solution D and left standing for one hour. After that, the substrate was rinsed with about 100 ml of THF and left to air-dry to form a monomolecular layer.

Figure 8:
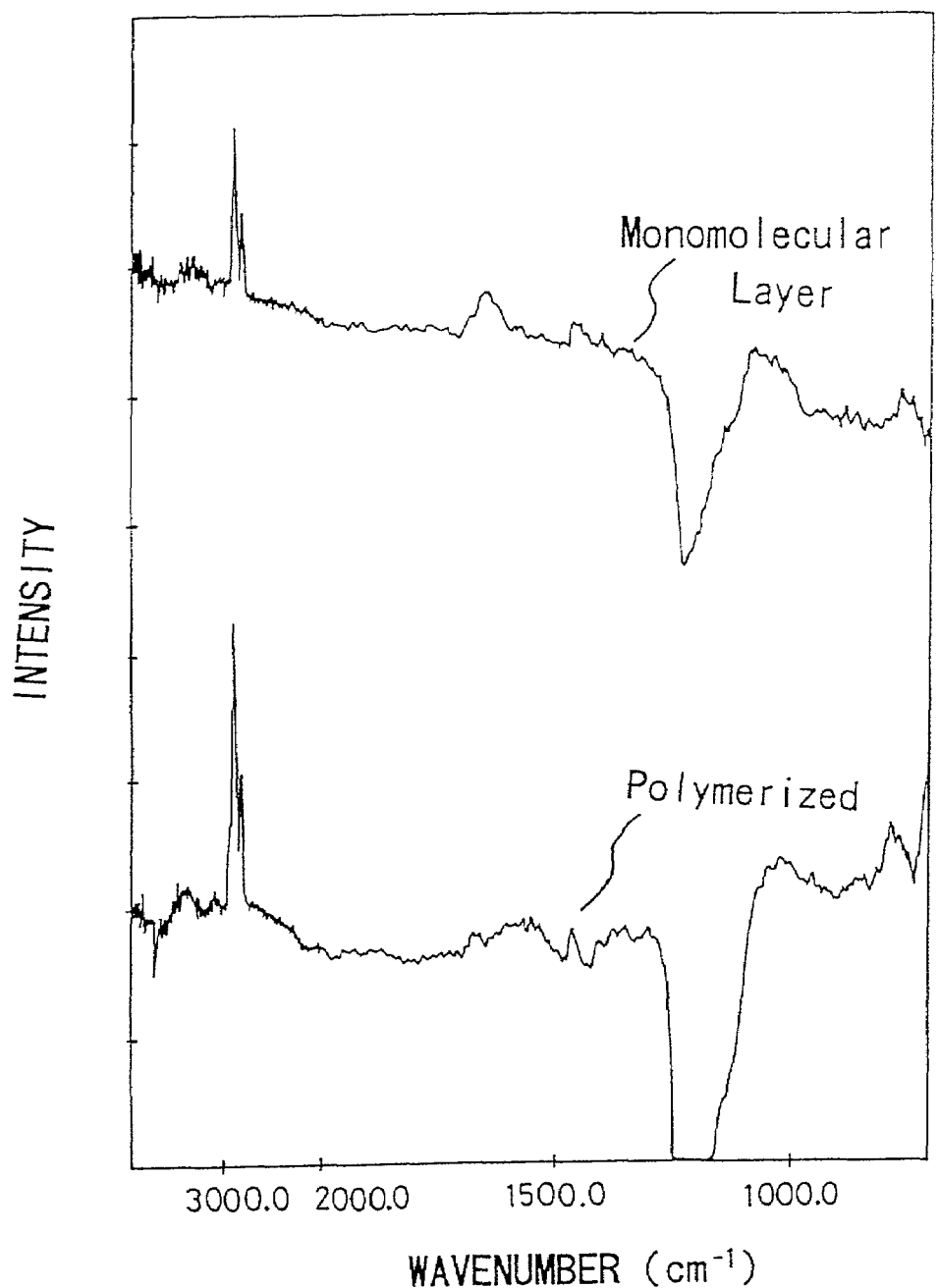
FIG. 8 is an FT-IR spectral diagram of an organic ultra-thin film before and after polymerization growth in still another embodiment of the present invention.

When the monomolecular layer thus prepared was studied by FT-IR, characteristic signals were found at wavenumbers of 2,927.7 $cm^{-1}$, 1,650 $cm^{-1}$, 1,465 $cm^{-1}$ and 1,080 $cm^{-1}$ as shown in FIG. 8. Those signals indicate the presence of $vCH_2$, thiophene skeleton, $\delta CH_2$ and Si—O, respectively.

Figure 9:
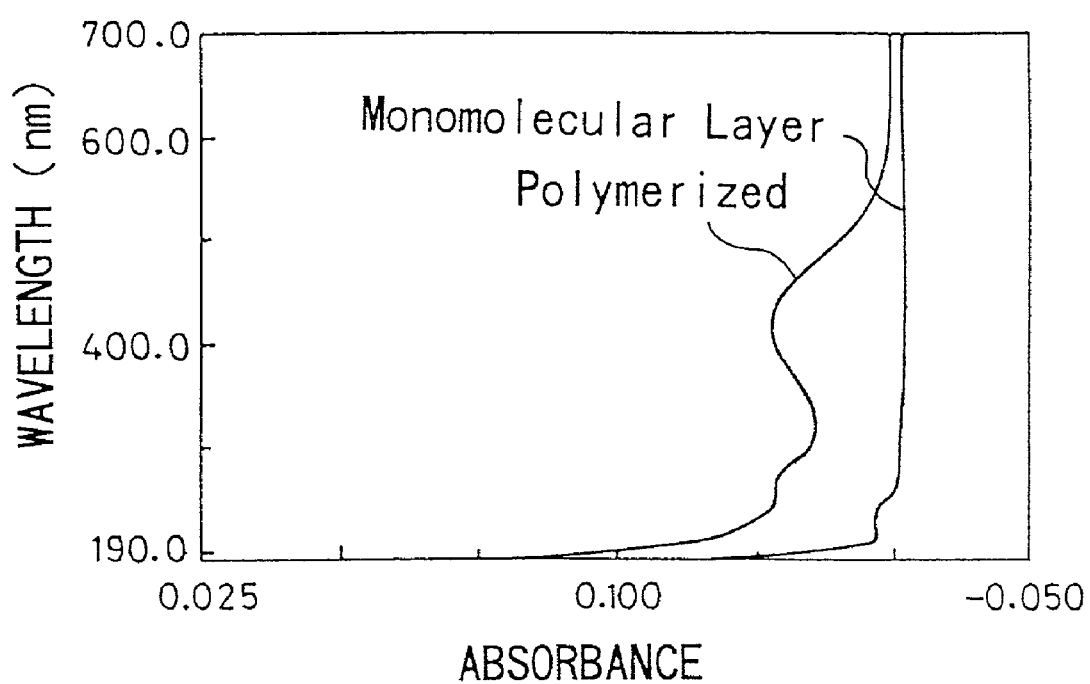
FIG. 9 is a UV/VIS spectral diagram of the same organic ultra-thin film before and after polymerization growth.

The thin film was also measured by UV/VIS, and an absorption peak was observed at a wavelength of 230 nm as shown in FIG. 9.

Figure 10:
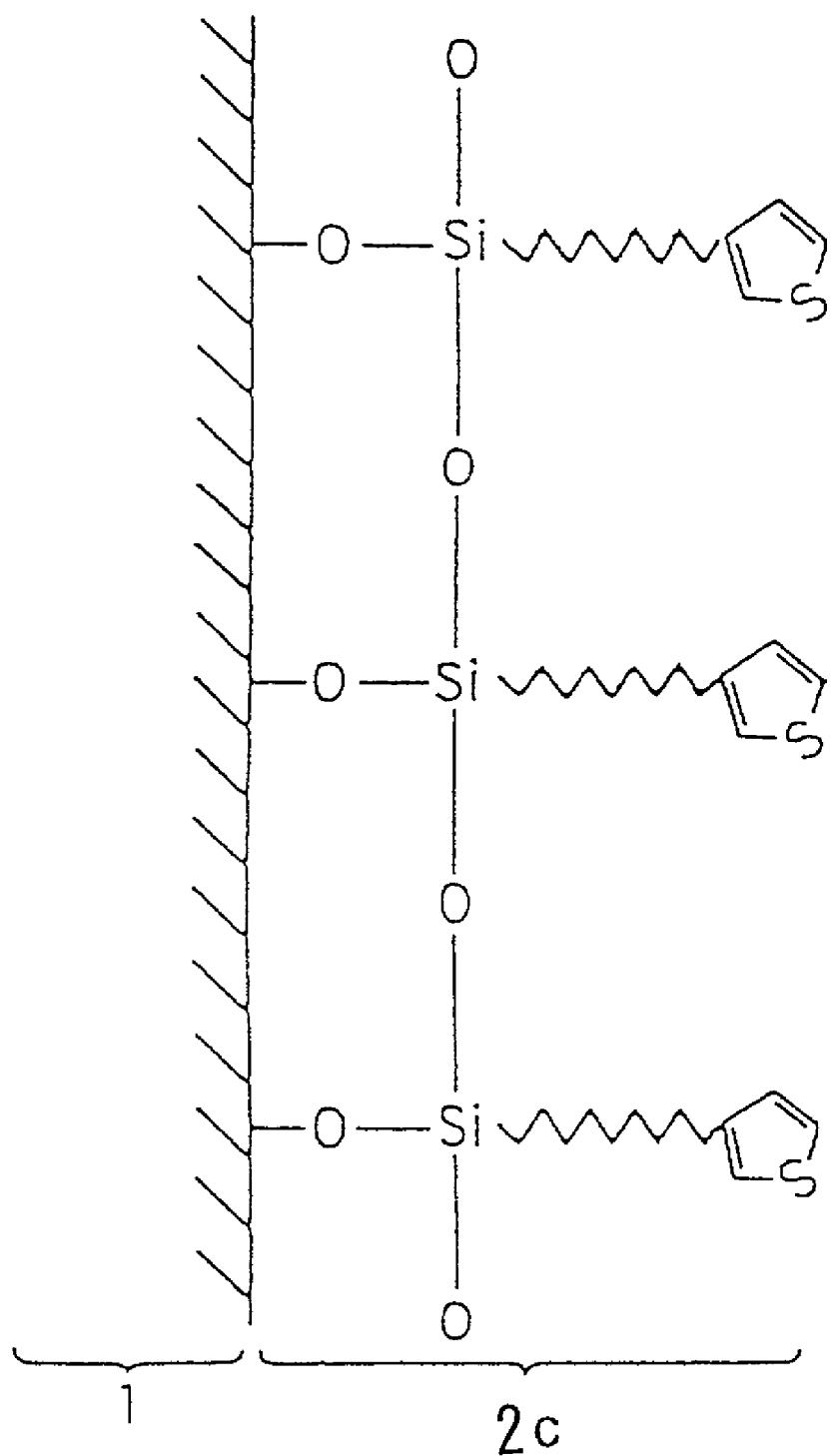
FIG. 10 is a structural view of a monomolecular layer of the organic ultra-thin film.

Those results show that the monomolecular layer has a structure as shown in FIG. 10. That is, to a glass substrate 1 is fixed a monomolecular layer 2c of 3-decyl thiophene by siloxane bond.

Then, solution E was prepared by dissolving 4.84 μl of 3-octyl thiophene and 10.4 mg of dry $FeCl_3$ in 30 ml of distilled and refined acetonitrile.

The substrate 1 with the monomolecular layer 2c formed thereon was dipped in solution E for one hour. This substrate 1 was then rinsed with about 100 ml of acetonitrile and left to air-dry, thereby forming a layer 3c with 3-octyl thiophene polymerized on the monomolecular layer 2c.

When the obtained thin film was measured by FT-IR, the results as shown in FIG. 8 were obtained. That is, the signals at wavenumbers of 2,927.7 $cm^{-1}$ and 1,465 $cm^{-1}$ are observed, while the signal at 1,650 $cm^{-1}$ disappears. The signal at a wavenumber of 1,550 $cm^{-1}$ newly appears, while the signal at 1,080 $cm^{-1}$ is unchanged. The signal at 1,550 $cm^{-1}$ indicates the presence of heterocyclic ring.

A UV/VIS measurement showed that a new high absorption peak appears at a wavelength of 420 nm as shown in FIG. 9.

Figure 11:
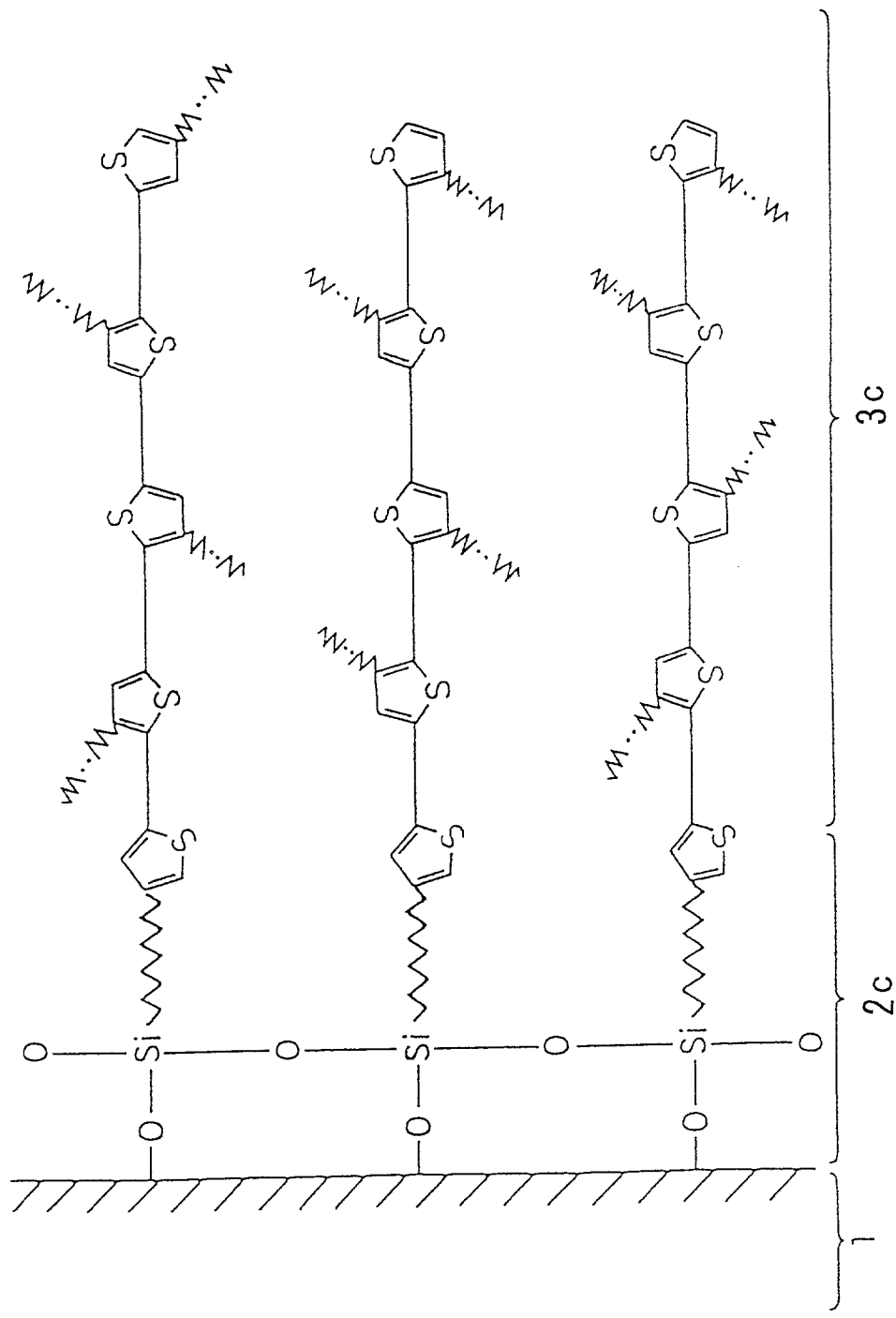
FIG. 11 is a structural view of an organic ultra-thin film the same embodiment.

Those results show that the obtained thin film has a structure as shown in FIG. 11. That is, the monomolecular 2c formed with 3-decyl thiophene polymerized is fixed on the glass substrate 1 by siloxane bond. To this monomolecular layer 2c is fixed a polymer layer 3c formed by polymerization of 3-octyl thiophene. 3-octyl thiophenes are combined with each other into a polymer at the second position of the thiophene ring. The monomolecular layer 2c of 3-decyl thiophene and the polymer layer 3c are also combined with each other in the second position of the thiophene ring.

The polarization analysis showed that the thickness of this film was 25.5 nm (refractive index of 1.49). The water contact angle of the thin film was 119 by the same measurement as in Example 2.

To study the heat resistance of the thin film, pieces of the thin film were heated in the air at 200° C. for 10, 30, 50, 100 or 150 hours, respectively, and the water contact angles were measured. The results are shown in Table 5.

TABLE 5

| Heating time (hours) | 0 | 10 | 30 | 50 | 100 | 150 |
|---|---|---|---|---|---|---|
| Water Contact Angle (degrees) | 119 | 119 | 119 | 119 | 119 | 117 |

As indicated in Table 5, the thin film retains high water repellency even after 150-hour heating.

To test the wear resistance, pieces of the thin film was then rubbed 1,000, 3,000 or 5,000 times with dry sponge under a load of 2 kgf, and the contact angles with water were measured, respectively. The results are shown in Table 6.

TABLE 6

| Number of rubbings | 0 | 1,000 | 3,000 | 5,000 |
|---|---|---|---|---|
| Water Contact Angle (degrees) | 119 | 116 | 110 | 110 |

As shown in Table 6, the thin film retains high water repellency even after 5,000-time rubbing.

EXAMPLE 6

Solution E was prepared by mixing 18 ml of isopropanol and 0.2 ml of 2-aminoterephtalic acid. With this solution E, a thin film was formed on a glass substrate, on the surface of which copper had been deposited beforehand, as same in Example 1.

When the thin film thus prepared was studied by FT-IR, characteristic signals were found at wavenumbers of 1,700 $cm^{-1}$, 660 $cm^{-1}$, 610 $cm^{-1}$ and 1,450 $cm^{-1}$ Those signals indicate the presence of C=Q, C=C, C—O—Cu and C=C of the benzene ring, respectively.

Those results show that the 2-amino terephtalic acid is fixed on the copper by a coordinate bond.

Then, 1.5 g of anhydrous pyromellitic acid was dissolved in 30 ml of distilled and refined dimethyl acetamide in a nitrogen atmosphere. While stirring the solution, the substrate was dipped into this solution and left there standing for 20 minutes. Then, the similar dimethyl acetamide solution further containing 1.6 g of bis(4-aminophenyl)ether dissolved therein was dropped into the solution for 2 minutes. Then, the mixture solution was left there for 30 minutes while being stirred.

When the substrate was taken out, the substrate was coated with a yellowish white thin film. However, the thin film turned clear by washing with chloroform.

Then, the thin film formed on the substrate was heated at 250° C. for 1 hour. The heat-treated thin film exhibits water repellency with a water contact angle of 127°.

When the thin film thus prepared was studied by FT-IR, characteristic signals were found at wavenumbers of 3,010 $cm^{-1}$, 1,670 $cm^{-1}$, 1,610 $cm^{-1}$, 1,450 $cm^{-1}$ and 1,400 $cm^{-1}$. Those signals indicate the presence of C—H in benzene ring, C=O, C—O—Cu, benzene skeleton, and —N—C(=O)—, respectively.

A polarization analysis showed that the thickness of this thin film was 18 nm (refractive index of 1.48).

Figure 12:
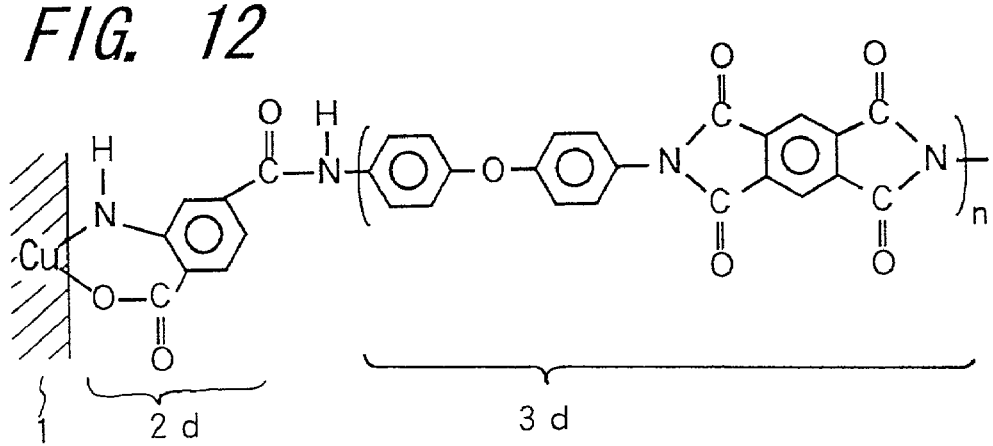
FIG. 12 is a structural view of an organic ultra-thin film in still further embodiment of the present invention.

Those results show that the thin film has a structure as shown in FIG. 12. That is, skeleton of anthranilic acid 2d is fixed to the copper-deposited glass substrate 1 by a coordinate bond, and the polymer layer 3d was formed by a growth of polyimide chain.

EXAMPLE 7

Solution F was prepared by dissolving 23.4 mg of 2,4-diaminobenzoic acid in 20 ml of iso-propanol.

With this solution F, a thin film was formed on a glass substrate, on the surface of which copper had been deposited beforehand, as same in Example 1.

When the thin film thus prepared was studied by FT-IR, characteristic signals were found at wavenumbers of 3,450 $cm^{-1}$, 1,700 $cm^{-1}$, 1,660 $cm^{-1}$ and 1,450 $cm^{-1}$. Those signals indicate the presence of N—H, C=O, C—O—Cu and C=C of the benzene ring.

Those results show that the 2,4-diaminobenzoic acid is fixed on the copper by coordinate bond.

Figure 13:
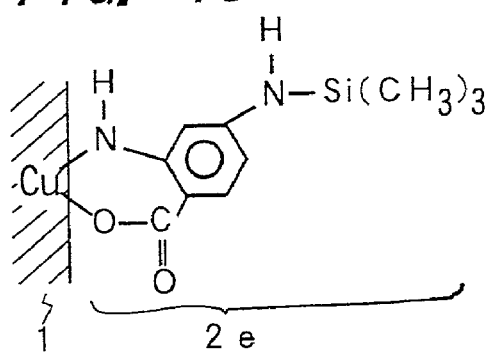
FIG. 13 is a structural view of a monomolecule layer in still further embodiment of the present invention.

Then, the thin layer was subjected to a reaction with trimethylchlorosilane (trimethylsilylation) so as to form a layer 2e shown in FIG. 13.

13.3 mg of lithium chloride was dissolved into 20 ml of distilled and refined N-methyl-2-pyrrolidone (hereinafter referred to as NMP). The substrate with the layer 2e was dipped into the solution being stirred and maintained at −15° C. in a nitrogen atmosphere for 15 minutes. Then, 15.3 mg of (4-aminophenyl)ether was added to the solution, and the solution was further stirred for 30 minutes.

When the layer 2e became gel-like state after 2-hour stirring, the substrate was taken out and rinsed with NMP and methanol sufficiently, thereby a thin film being formed on the substrate.

When the thin film was measured by FT-IR, the signals are risen at wavenumbers of 3,350 $cm^{-1}$, 3,010 $cm^{-1}$, 1,670 $cm^{-1}$, 1,610 $cm^{-1}$ and 1,450 $cm^{-1}$. These signals indicate the presence of N—H, H of benzene ring, C=O, C—O—Cu, and benzene skeleton, respectively.

The polarization analysis showed that the thickness of this thin film was 22 nm (refractive index of 1.48).

Figure 14:
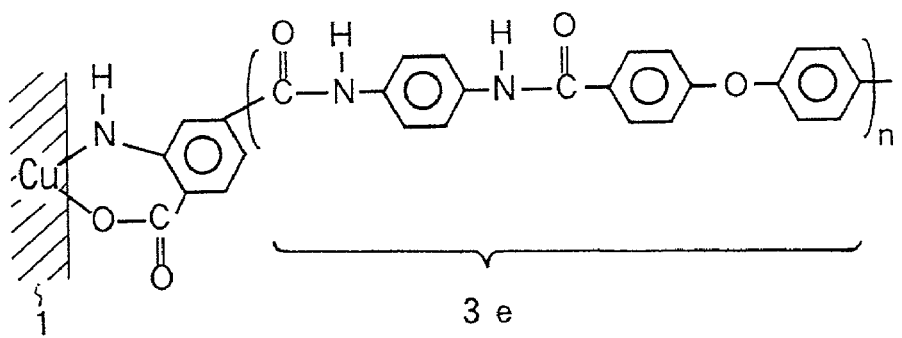
FIG. 14 is a structural view of an organic ultra-thin film in the same embodiment.

Those results show that the prepared thin film has a structure as shown in FIG. 14. That is, skeleton of anthranilic acid is fixed to the copper-deposited glass substrate 1 by a coordinate bond, and a thin layer 3e was formed by a growth of aromatic polyamide chain.

EXAMPLE 8

2-aminoterephthalic acid was fixed on a glass substrate having a copper deposited layer thereon as same in Example 6.

Then, a solution was prepared by dissolving 19.5 mg of 2-methyl-1,4-phenylenediamine in 15 ml of ethanol.

The substrate with the thin film was dipped into the solution. After being stirred for 15 minutes, another solution prepared by dissolving 15.2 mg of terephthalaldehyde into 15 ml of ethanol was further added to the solution. After 1-hour stirring, the substrate was taken out from the mixture solution, rinsed with ethanol efficiently, dried under a reduced pressure and then heated at 150° C. for 1 hour.

When the thin film prepared was measured by FT-IR, the signals are risen at wavenumbers of 3,250 $cm^{-1}$, 3,010 $cm^{-1}$, 1,670 $cm^{-1}$, 1,640 $cm^{-1}$, 1,610 $cm^{-1}$ and 1,450 $cm^{-1}$. These signals indicate the presence of N—H, C—H in benzene ring, C=O, C=N, C—O—Cu and benzene skeleton, respectively.

The polarization analysis showed that the thickness of this film was 9.4 nm (refractive index of 1.48).

Figure 15:
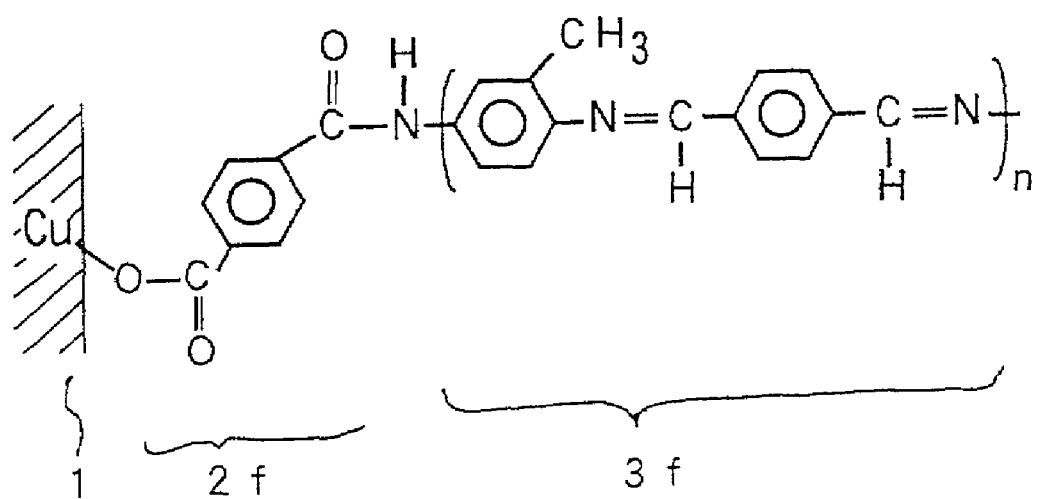
FIG. 15 is a structural view of an organic ultra-thin film in still further embodiment of the present invention.

Those results show that the prepared thin film has a structure as shown in FIG. 15. That is, skeleton of anthranilic acid 2f is fixed onto the copper-deposited glass substrate 1 by coordinate bond, and the thin layer 3f was formed by a growth of polyazomethyne chain via amide bond.

EXAMPLE 9

Solution G was prepared by dissolving 20.8 mg of 3,4-diaminobenzaldehyde into 20 ml of iso-propanol.

With this solution G, a thin film was formed on a glass substrate, on the surface of which copper had been deposited beforehand, as same in Example 1.

When the prepared thin film was measured by FT-IR, the signals are risen at wavenumbers of $1,700 \text{ cm}^{-1}$, $1,660 \text{ cm}^{-1}$, $1,610 \text{ cm}^{-1}$ and $1,450 \text{ cm}^{-1}$. These signals indicate the presence of C=O, C=C, C—C—Cu and skeleton of benzene, respectively.

Those results show that 3,4-diaminobenzaldehyde was fixed on the copper by a coordinate bond.

On the other hand, a solution was prepared by dissolving 3 g of polypyrrole into 50 ml of acetonitrile. The substrate is dipped into the solution and the solution was stirred for 30 minutes.

Then the substrate was taken out from the solution, rinsed with acetonitrile sufficiently, and dried under the reduced pressure.

When thus prepared thin film was measured by FT-IR, the signals are risen at wavenumbers of $3,400 \text{ cm}^{-1}$, $3,010 \text{ cm}^{-1}$, $670 \text{ cm}^{-1}$, $640 \text{ cm}^{-1}$, $610 \text{ cm}^{-1}$, $590 \text{ cm}^{-1}$ and $1,450 \text{ cm}^{-1}$. These signals indicate the presence of H in pyrrole, H in benzene ring, C=O, C=N, C—O—Cu, skeleton of pyrrole and skeleton of benzene, respectively.

A polarization analysis showed that the thickness of this thin film was 9.4 nm (refractive index of 1.48).

Figure 16:
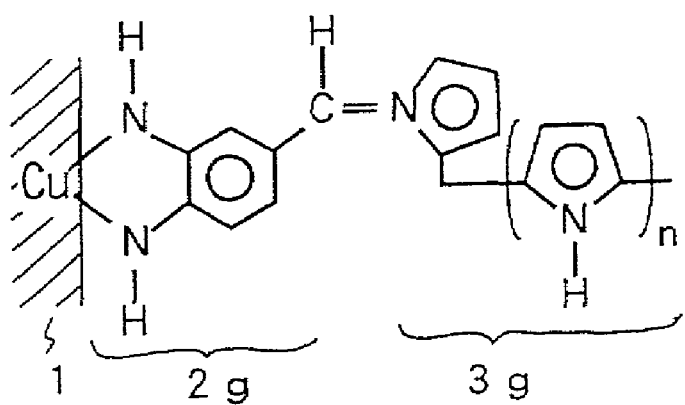
FIG. 16 is a structural view of an organic ultra-thin film in still further embodiment of the present invention.

Those results show that the prepared thin film has a structure as shown in FIG. 16. That is, skeleton of diaminobenzene 2 g is fixed to the copper-deposited glass substrate 1 by a coordinate bond, and polypyrrole 3 g was further fixed on it via imide bond.

The Entire disclosure of Japanese Patent Application No. Hei 8-339749 filed Dec. 19, 1996 including specification, claims, drawings and summary is incorporated herein by reference in its entirely.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An organic ultra-thin film comprising a straight chain polymer polymerized from a molecule fixed on a substrate to a surface of the ultra-thin film, wherein the molecule is fixed on the substrate by a bond selected from the group consisting of bonds represented by:

$$M_2\text{—O—A—} \quad \text{Formula (3)}$$

wherein A represents a sulfur atom, a germanium atom, a titanium atom, a tin atom, or a zirconium atom in the molecule, and $M_2$ represents a constituent atom in the substrate;

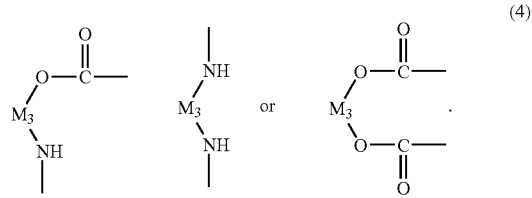

wherein $M_3$ represents a transition metal in the substrate; and $$A_1\text{—O—}A_1\text{'—} \quad \text{Formula (5)}$$

wherein $A_1$ and $A_1'$ each represent a germanium atom, a titanium atom, a zirconium atom, or a sulfur atom.

2. The film of claim 1, wherein the polymer comprises a fluorine atom.

3. The film of claim 1, wherein a thickness of the film is about five to about one hundred nanometers.

* * * * *